United States Patent
Wu et al.

(10) Patent No.: US 9,854,466 B2
(45) Date of Patent: Dec. 26, 2017

(54) METHOD AND APPARATUS FOR MANAGING MONITORING TASK

(71) Applicant: ZTE Corporation, Shenzhen (CN)

(72) Inventors: Hao Wu, Shenzhen (CN); Fang Xie, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 27 days.

(21) Appl. No.: 14/435,247

(22) PCT Filed: Aug. 13, 2013

(86) PCT No.: PCT/CN2013/081360
§ 371 (c)(1),
(2) Date: Aug. 3, 2015

(87) PCT Pub. No.: WO2014/056345
PCT Pub. Date: Apr. 17, 2014

(65) Prior Publication Data
US 2016/0192223 A1    Jun. 30, 2016

(30) Foreign Application Priority Data
Oct. 12, 2012  (CN) .......................... 2012 1 0387208

(51) Int. Cl.
*H04L 1/00*     (2006.01)
*H04W 24/10*    (2009.01)
(Continued)

(52) U.S. Cl.
CPC ........... *H04W 24/10* (2013.01); *H04W 4/005* (2013.01); *H04W 24/00* (2013.01); *H04W 88/18* (2013.01)

(58) Field of Classification Search
CPC ..... H04L 47/10; H04L 43/50; H04L 12/2697; H04L 12/24; H04W 24/10; H04W 4/005; H04W 24/00; H04W 88/18
See application file for complete search history.

(56) References Cited

U.S. PATENT DOCUMENTS

2007/0180089 A1* 8/2007 Fok ..................... H04W 24/00
                                                     709/223
2011/0213871 A1* 9/2011 DiGirolamo ........... H04W 4/00
                                                     709/223
(Continued)

FOREIGN PATENT DOCUMENTS

CN          102136976 A      7/2011
CN          102238573 A      11/2011
(Continued)

OTHER PUBLICATIONS

International Search Report for corresponding application PCT/CN2013/081360 filed Aug. 13, 2013; dated Nov. 21, 2013.
(Continued)

*Primary Examiner* — Abdelnabi O Musa
(74) *Attorney, Agent, or Firm* — Cantor Colburn LLP

(57) ABSTRACT

Disclosed are a method and apparatus for managing a monitoring task, the method comprising: receiving, by a gateway, monitoring configuration information transmitted by a machine to machine (M2M) service platform or M2M application server, wherein a management parameter for managing a monitoring task is carried in the monitoring configuration information; managing the monitoring task by the gateway according to the management parameter. The effect that the gateway can effectively manage the monitoring task is achieved.

6 Claims, 2 Drawing Sheets

(51) Int. Cl.
H04W 24/00 (2009.01)
H04W 88/18 (2009.01)
H04W 4/00 (2009.01)

(56) References Cited

U.S. PATENT DOCUMENTS

| 2012/0047551 | A1* | 2/2012 | Pattar | H04W 4/00 726/1 |
| 2012/0213185 | A1* | 8/2012 | Frid | H04W 4/005 370/329 |
| 2013/0041997 | A1* | 2/2013 | Li | H04L 67/12 709/223 |

FOREIGN PATENT DOCUMENTS

| CN | 102264087 A | 11/2011 |
| EP | 2911438 A1 | 8/2015 |
| WO | 2011051182 A1 | 5/2011 |

OTHER PUBLICATIONS

"OMA-DM-2011-0074-INP_Discussion_Material_for_Joint_Meeting_with_OMA_DM", Open Mobile Alliance (OMA) May 24, 2011. pp. 1-4, XP064066726.
3rd Generation Partnership Project, Technical Specification Group Services and System Aspects; Service Requirements for Machine type Communications, Sep. 18, 2012, pp. 1-25, XP050649170.
European Search Report for corresponding application EP 13 84 5179; dated Nov. 6, 2015.
Suman Pandy, et al., "Towards mangement of machine to machine networks", Network Operations and Management Symposium, Sep. 21, 2011, pp. 1-7, XP032021550.

* cited by examiner

METHOD AND APPARATUS FOR MANAGING MONITORING TASK

TECHNICAL FIELD

The present invention relates to the field of communications, and in particular to a method and apparatus for managing a monitoring task.

BACKGROUND

A machine to machine (referred to as M2M) communication network can extend the communication category and communication field of an existing information communication network, acquire information from a physical world by embedding intelligent and communication capabilities in various possible things, and enhance and improve the intellectuality, interactivity and automaticity of the existing information communication network based on analyzing and processing the information.

The M2M communication network has a plurality of network forms, which can be an independent physical network which is separately constructed, and can also be a logical network constructed on the existing public communication network and various government and enterprise private networks.

The M2M communication network can be divided into three layers in the aspect of a logical function: a sensing extension layer, a network/service layer, and an application layer. The three layers are introduced below:

The sensing extension layer: it mainly achieves acquisition, automatic identification and intelligent control of information in the physical world. Various things in the physical world do not have communication capability itself. Intelligent nodes, such as a sensor, an actuator, an intelligent apparatus, and an RFID reader/writer, acquire the information in the physical world, and perform information interaction via a communication module with the network layer. Main components contained therein are an M2M terminal device and an M2M gateway device.

The network/service layer: the network/service layer supports transmission, routing, and controlling of the information of the sensing layer, and provides support the communication between human and thing, between thing and thing in the Internet of Things. Combined with classification of the Internet of Things, the network forms specifically contained on the network layer are: a communication network, an Internet and an industry network, etc. The main component contained therein is an M2M platform.

The application layer: the application layer contains various specific applications of the Internet of Things, including both a public service and an industry service which can be a public-oriented industry public service and can also be an industry dedicated service which meets specific application requirements inside an industry. The public service is a basic service provided by aiming at public universal requirements, such as intelligent home, mobile payment, etc. The industry dedicated service is generally a service provided by aiming at specific requirements peculiar to the industry, and for the inside of the industry, such as an intelligent grid, intelligent transportation and an intelligent environment, wherein some of the industry services can also be provided for the public, such as intelligent transportation, which are referred to as industry public services. Main component contained therein is an M2M application server.

A terminal peripheral: the terminal peripheral refers to a single device such as the sensor having an environment sensing function, which can transmit sensed information to an M2M service platform or an M2M application via an M2M gateway, and meanwhile can also receive downlink control thereon performed by the M2M application or the M2M service platform.

The M2M gateway: an M2M terminal peripheral, with features that the processing capability, storage capability and power supply thereof are restricted, cannot directly communicate with a communication network, and needs to access the communication network via the M2M gateway. The M2M gateway can perform a protocol conversion between an M2M sensing extension layer and an upper network. Besides of being able to converge and forward data information acquired by the M2M terminal peripheral, the M2M gateway can also receive control information of the M2M application or the M2M service platform so as to manage the terminal peripheral.

The M2M platform provides some common capabilities and support to the M2M application, and provides an open interface so that the application can access and use network resources and capabilities. By shielding a specific network implementation of the bottom layer from a specific M2M application, the complexity of the application development of the Internet of Things can be simplified and the cost of the application development and deployment of the Internet of Things can be reduced.

In an M2M communication network architecture, a gateway, as a functional entity connecting and managing a terminal device on the sensing extension layer, needs to be able to provide information, such as an execution state of the M2M application, an operational state of the gateway software and hardware, and an operational state of the terminal device, for the M2M platform or the M2M application server, so as to provide statistical data and failure warning for the M2M platform or the M2M application server. However, the prior art does not provide a monitoring manner that is able to meet above requirement in the M2M communication network architecture; in addition, it is also unable to divide monitoring tasks into different types according to a monitoring object and a reporting manner, and unable to perform operations, such as addition, deletion, or modification, on the monitoring task via the M2M service platform, the M2M application server or the gateway.

With regard to the problem in the related art of being unable to divide monitoring tasks into different types according to a monitoring object and a reporting manner, and being unable to perform operations, such as addition, deletion, or modification, on the monitoring task(s) via the M2M service platform, the M2M application server or the gateway, no effective solution has been presented.

SUMMARY

An embodiment of the present invention provides a method and apparatus for managing a monitoring task, to at least solve the above-mentioned problem.

According to one aspect of the present invention, a method for managing a monitoring task is provided, comprising: receiving, by a gateway, monitoring configuration information transmitted by a machine to machine, M2M, service platform or an M2M application server, wherein a management parameter for managing a monitoring task is carried in the monitoring configuration information; and managing the monitoring task by the gateway according to the management parameter.

Alternatively, the management parameter comprises: a monitoring task addition/modification list, and/or a monitoring task deletion list.

Alternatively, the monitoring task addition/modification list comprises one of the following combinations: a monitoring identifier, a monitoring object, and a report configuration; the monitoring identifier and the monitoring object; and the monitoring identifier and the report configuration; and the monitoring task deletion list comprises: the monitoring identifier.

Alternatively, the managing the monitoring task by the gateway according to the management parameter comprises: when the management parameter contains the monitoring task addition/modification list, if a first monitoring identifier in the monitoring task addition/modification list is not in a local monitoring task list, storing, by the gateway, the first monitoring identifier, a first monitoring object corresponding to the first monitoring identifier, and a first report configuration corresponding to the first monitoring identifier as a new monitoring task in the local monitoring task list; and if the first monitoring identifier in the monitoring task addition/modification list is in the local monitoring task list, replacing, by the gateway, a second monitoring object corresponding to a second monitoring identifier which is the same as the first monitoring identifier, and/or a second report configuration corresponding to the second monitoring identifier in the local monitoring task list with the first monitoring object corresponding to the first monitoring identifier and/or the first report configuration corresponding to the first monitoring identifier.

Alternatively, the managing the monitoring task by the gateway according to the management parameter comprises: when the management parameter contains the monitoring task deletion list, after the gateway searches out a fourth monitoring identifier which is the same as a third monitoring identifier in the local monitoring task list according to the third monitoring identifier in the monitoring task deletion list, deleting the fourth monitoring identifier, a fourth monitoring object corresponding to the fourth monitoring identifier, and a fourth report configuration corresponding to the fourth monitoring identifier.

According to another aspect of the present invention, an apparatus for managing a monitoring task is provided, comprising: a receiving module, configured to receive monitoring configuration information transmitted by a machine to machine, M2M, service platform or an M2M application server, wherein a management parameter for managing a monitoring task is carried in the monitoring configuration information; and a managing module, configured to manage the monitoring task according to the management parameter.

Alternatively, the management parameter comprises: a monitoring task addition/modification list, and/or a monitoring task deletion list.

Alternatively, the monitoring task addition/modification list comprises one of the following combinations: a monitoring identifier, a monitoring object, and a report configuration; the monitoring identifier and the monitoring object; and the monitoring identifier and the report configuration; and the monitoring task deletion list comprises: the monitoring identifier.

Alternatively, when the management parameter contains the monitoring task addition/modification list, the managing module comprises: a storing unit, configured to, in the case that a first monitoring identifier in the monitoring task addition/modification list is not in a local monitoring task list, store the first monitoring identifier, a first monitoring object corresponding to the first monitoring identifier, and a first report configuration corresponding to the first monitoring identifier as a new monitoring task in the local monitoring task list; a replacing unit, configured to, in the case that the first monitoring identifier in the monitoring task addition/modification list is in the local monitoring task list, replace a second monitoring object corresponding to a second monitoring identifier which is the same as the first monitoring identifier, and/or a second report configuration corresponding to the second monitoring identifier in the local monitoring task list with the first monitoring object corresponding to the first monitoring identifier and/or the first report configuration corresponding to the first monitoring identifier.

Alternatively, when the management parameter contains the monitoring task deletion list, the managing module comprises: a searching unit, configured to search for a fourth monitoring identifier which is the same as a third monitoring identifier in a local monitoring task list according to the third monitoring identifier in the monitoring task deletion list; and a deleting unit, configured to, after the searching unit searches out the fourth monitoring identifier, delete the fourth monitoring identifier, a fourth monitoring object corresponding to the fourth monitoring identifier, and a fourth report configuration corresponding to the fourth monitoring identifier.

The embodiments of the present invention adopt the method that a gateway receives monitoring configuration information transmitted by an M2M service platform or an M2M application server, and manages a monitoring task in the monitoring configuration information according to a management parameter in the monitoring configuration information, so as to solve the problem of being unable to divide monitoring tasks into different types according to a monitoring object and a reporting manner, and being unable to perform operations, such as addition, deletion, or modification, on the monitoring task(s) via the M2M service platform, the M2M application server or the gateway, and achieve the effect that the gateway can effectively manage the monitoring task.

BRIEF DESCRIPTION OF THE DRAWINGS

Drawings, provided for further understanding of the present invention and forming a part of the specification, are used to explain the present invention together with embodiments of the present invention rather than to limit the present invention. In the drawings.

DETAILED DESCRIPTION OF THE EMBODIMENTS

The present invention is described below with reference to the drawings and embodiments in detail. It should be noted that the embodiments of the present application and the characteristics of the embodiments may be combined with each other if there is no conflict.

Figure 1:
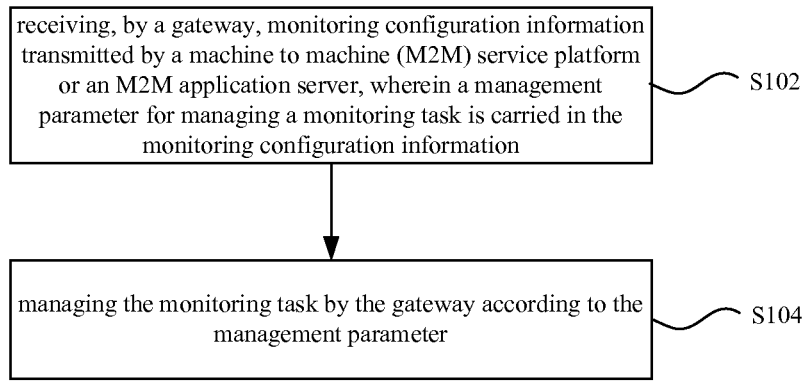
FIG. 1 is a flowchart of a method for managing a monitoring task according to an embodiment of the present invention.

FIG. 1 is a flowchart of a method for managing a monitoring task according to an embodiment of the present invention, and as shown in FIG. 1, the method mainly comprises the following steps (step S102-step S106):

step S102, receiving, by a gateway, monitoring configuration information transmitted by a machine to machine (M2M) service platform or an M2M application server, wherein a management parameter(s) for managing a monitoring task is carried in the monitoring configuration information; and step 104, managing the monitoring task by the gateway according to the management parameter.

In the present embodiment, the management parameter comprises: a monitoring task addition/modification list, and/or a monitoring task deletion list.

In the present embodiment, the monitoring task addition/modification list comprises one of the following combinations: a monitoring identifier, a monitoring object, and a report configuration; a monitoring identifier and a monitoring object; and a monitoring identifier and a report configuration. The monitoring task deletion list comprises: a monitoring identifier.

In the present embodiment, step S104 can be implemented in this way: when the management parameter contains the monitoring task addition/modification list, if a first monitoring identifier in the monitoring task addition/modification list is not in a local monitoring task list, storing, by the gateway, the first monitoring identifier, a first monitoring object corresponding to the first monitoring identifier, and a first report configuration corresponding to the first monitoring identifier as a new monitoring task in the local monitoring task list; and if the first monitoring identifier in the monitoring task addition/modification list is in the local monitoring task list, replacing, by the gateway, a second monitoring object corresponding to a second monitoring identifier which is the same as the first monitoring identifier, and/or a second report configuration corresponding to the second monitoring identifier in the local monitoring task list with the first monitoring object corresponding to the first monitoring identifier and/or the first report configuration corresponding to the first monitoring identifier.

In the present embodiment, step S104 can be implemented in this way: when the management parameter contains the monitoring task deletion list, after the gateway searches out a fourth monitoring identifier which is the same as a third monitoring identifier in the local monitoring task list according to the third monitoring identifier in the monitoring task deletion list, deleting by the gateway the fourth monitoring identifier, a fourth monitoring object corresponding to the fourth monitoring identifier, and a fourth report configuration corresponding to the fourth monitoring identifier.

The method for managing a monitoring task provided by the above-mentioned embodiment is described in further details below with reference to FIG. 2 and alternative embodiments. It should be noted that, the management herein substantively refers to the case where the gateway performs operations, such as addition, modification, or deletion, on the monitoring task.

Figure 2:
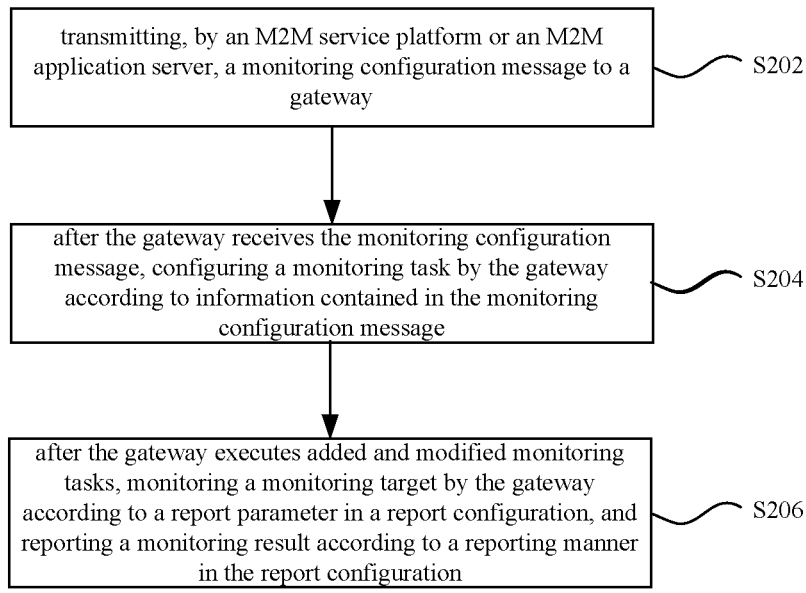
FIG. 2 is a flowchart of a method for managing a monitoring task according to an alternative embodiment of the present invention.

FIG. 2 is a flowchart of a method for managing a monitoring task according to an alternative embodiment of the present invention, and as shown in FIG. 2, the flow comprises the following steps (step S202-step S206):

step S202, transmitting, by an M2M service platform or an M2M application server, a monitoring configuration message to a gateway;

in the above, information contained in the monitoring configuration message is as shown in table 1:

TABLE 1

| Parameter |
|---|
| monitoring task addition/modification list |
| monitoring task deletion list |

Above two parameters (the monitoring task addition/modification list and the monitoring task deletion list) are introduced below:

(1) Monitoring Task Addition/Modification List

A monitoring task which needs to be added or modified is set in a monitoring task addition/modification list; and the monitoring task can be a piece of task information, and can also be multiple pieces of task information, wherein each piece of the monitoring task which needs to be added or modified contains the following information, as shown in FIG. 2:

TABLE 2

| monitoring identifier |
|---|
| monitoring object |
| report configuration |

The monitoring identifier: it is used for uniquely identifying one monitoring task, and is allocated by the M2M service platform or the M2M application server.

The monitoring object: it is used for indicating an object which needs to be monitored, such as a WAN (wide area network) port of a gateway, or an LAN (local area network) port of a gateway, or a terminal peripheral, or a gateway, or a gateway software module, or a gateway hardware module.

The report configuration: it is used for setting a reporting manner and a reporting parameter, wherein the reporting manner comprises: periodical reporting and event triggering reporting, the periodical reporting refers to reporting a monitoring result according to a pre-determined period, and the event triggering reporting refers to reporting a monitoring result when a pre-determined trigger condition is satisfied; and the reporting parameter is used for indicating which monitoring data is to be reported.

(2) Monitoring Task Deletion List

Figure 3:
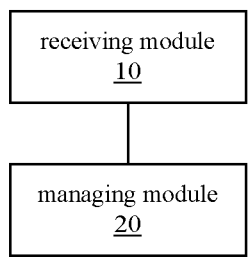
FIG. 3 is a structure block diagram of an apparatus for managing a monitoring task according to an embodiment of the present invention.

A monitoring task which needs to be deleted is set in a monitoring task deletion list; and the monitoring task can be a piece of task information, and can also be multiple pieces of task information, wherein each piece of the monitoring task which needs to be deleted contains the following information, as shown in FIG. 3:

TABLE 3

| monitoring identifier |
|---|

Step S204, after the gateway receives the monitoring configuration message, configuring a monitoring task by the gateway according to information contained in the monitoring configuration message.

1. If the monitoring task addition/modification list is contained in the received monitoring configuration information:

(1) if a monitoring identifier in the monitoring task addition/modification list is not in a local monitoring task list, storing, by the gateway, the monitoring identifier, a corresponding monitoring object and report configuration in the local monitoring task list, as a new monitoring task; and (2) if the monitoring identifier in the monitoring task addition/modification list is in the local monitoring task list, setting, by the gateway, a monitoring object, and/or a report configuration corresponding to the monitoring identifier in the local monitoring task list as a monitoring object, and/or a report configuration corresponding to the monitoring identifier in the monitoring task addition/modification list.

2. If the monitoring task deletion list is contained in the received monitoring configuration information:

deleting, by the gateway, a corresponding monitoring task in the local monitoring task list according to a monitoring identifier in the monitoring task deletion list, i.e. deleting the monitoring identifier, monitoring object and report configuration of the monitoring task; and if the monitoring task which needs to be deleted is reported by means of the periodical reporting, stopping a periodic timer which is set by the gateway.

Step S206, after the gateway executes added and modified monitoring tasks, monitoring a monitoring target by the gateway according to a report parameter in the report configuration, and reporting a monitoring result according to a reporting manner in the report configuration.

The method for managing a monitoring task provided by the above-mentioned embodiment is adopted to solve the problem of being unable to divide monitoring tasks into different types according to a monitoring object and a reporting manner, and being unable to perform operations, such as addition, deletion, or modification, on the monitoring task(s) via the M2M service platform, the M2M application server or the gateway, thus achieving the effect that the gateway can effectively manage the monitoring task.

FIG. 3 is a structure block diagram of an apparatus for managing a monitoring task according to an embodiment of the present invention, and the apparatus is configured to achieve the method for managing a monitoring task provided by the above-mentioned embodiment. As shown in FIG. 3, the apparatus comprises: a receiving module 10 and a managing module 20. The receiving module 10 is configured to receive monitoring configuration information transmitted by a machine to machine (M2M) service platform or an M2M application server, wherein a management parameter for managing a monitoring task is carried in the monitoring configuration information; and a managing module 20, connected to the receiving module 10, is configured to manage the monitoring task according to the management parameter.

In the present embodiment, the management parameter comprise: a monitoring task addition/modification list, and/or a monitoring task deletion list.

In the present embodiment, the monitoring task addition/modification list comprises one of the following combinations: a monitoring identifier, a monitoring object, and a report configuration; a monitoring identifier and a monitoring object; and a monitoring identifier and a report configuration. The monitoring task deletion list comprises: a monitoring identifier.

Figure 4:
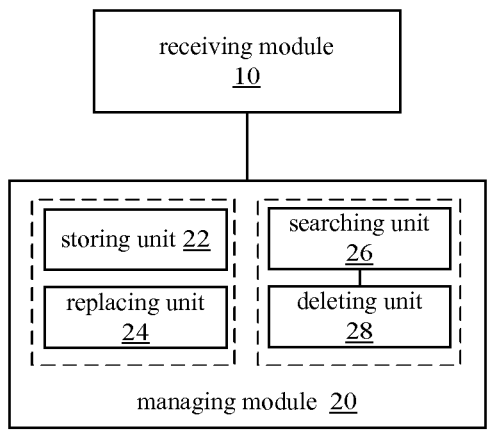
FIG. 4 is a structure block diagram of an apparatus for managing a monitoring task according to an alternative embodiment of the present invention.

FIG. 4 is a structure block diagram of an apparatus for managing a monitoring task according to an alternative embodiment of the present invention; and as shown in FIG. 4, in the apparatus provided by the alternative embodiment, when the management parameter contains the monitoring task addition/modification list, the managing 20 may comprise: a storing unit 22 and a replacing unit 24. The storing unit 22 is configured to, in the case that a first monitoring identifier in the monitoring task addition/modification list is not in a local monitoring task list, store the first monitoring identifier, a first monitoring object corresponding to the first monitoring identifier, and a first report configuration corresponding to the first monitoring identifier as a new monitoring task in the local monitoring task list; and the replacing unit 24 is configured to, in the case that the first monitoring identifier in the monitoring task addition/modification list is in the local monitoring task list, replace a second monitoring object corresponding to a second monitoring identifier which is the same as the first monitoring identifier, and/or a second report configuration corresponding to the second monitoring identifier in the local monitoring task list with the first monitoring object corresponding to the first monitoring identifier and/or the first report configuration corresponding to the first monitoring identifier.

In the apparatus provided by the alternative embodiment, when the management parameter contains the monitoring task deletion list, the managing module 20 may comprise: a searching unit 26 and a deleting unit 28. The searching unit 26 is configured to search for a fourth monitoring identifier which is the same as a third monitoring identifier in the local monitoring task list according to the third monitoring identifier in the monitoring task deletion list; and a deleting unit 28, connected to the searching unit 26, is configured to, after the searching unit searches out the fourth monitoring identifier, delete the fourth monitoring identifier, a fourth monitoring object corresponding to the fourth monitoring identifier, and a fourth report configuration corresponding to the fourth monitoring identifier.

The apparatus for managing a monitoring task provided by the above-mentioned embodiment is adopted to solve the problem of being unable to divide monitoring tasks into different types according to a monitoring object and a reporting manner, and being unable to perform operations, such as addition, deletion, or modification, on the monitoring task via the M2M service platform, the M2M application server or the gateway, thus achieving the effect that the gateway can effectively manage the monitoring task.

From the description above, it can be seen that the embodiment of present invention achieves the following technical effects: the manner that a gateway receives monitoring configuration information transmitted by an M2M service platform or an M2M application server, and manages a monitoring task in the monitoring configuration information according to a management parameter in the monitoring configuration information is adopted to solve the problem of being unable to divide monitoring tasks into different types according to a monitoring object and a reporting manner, and being unable to perform operations, such as addition, deletion, or modification, on the monitoring task via the M2M service platform, the M2M application server or the gateway, thus achieving the effect that the gateway can effectively manage the monitoring task.

Apparently, those skilled in the art shall understand that the above-mentioned modules and steps of the present invention can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the present invention is not restricted to any particular hardware and software combination.

The above descriptions are only alternative embodiments of the present invention and are not intended to limit the present invention, and the present invention can have a variety of changes and modifications for those skilled in the art. Any modification, equivalent replacement, or improvement made within the spirit and principle of the present invention shall all fall within the protection scope of the present invention.

What is claimed is:

1. A method for managing a monitoring task, comprising:
    receiving, by a gateway, monitoring configuration information transmitted by a machine to machine, M2M, service platform or an M2M application server, wherein a management parameter for managing a monitoring task is carried in the monitoring configuration information; and
    managing the monitoring task by the gateway according to the management parameter, wherein the management parameter comprises: a monitoring task addition/modification list, and/or a monitoring task deletion list, wherein managing the monitoring task by the gateway according to the management parameter comprises:
    when the management parameter contains the monitoring task addition/modification list, and a first monitoring identifier in the monitoring task addition/modification list is not in a local monitoring task list, storing, by the gateway, the first monitoring identifier, a first monitoring object corresponding to the first monitoring identifier, and a first report configuration corresponding to the first monitoring identifier as a new monitoring task in the local monitoring task list; and
    when the management parameter contains the monitoring task addition/modification list, and the first monitoring identifier in the monitoring task addition/modification list is in the local monitoring task list, replacing, by the gateway, a second monitoring object corresponding to a second monitoring identifier which is the same as the first monitoring identifier, and/or a second report configuration corresponding to the second monitoring identifier in the local monitoring task list with the first monitoring object corresponding to the first monitoring identifier and/or the first report configuration corresponding to the first monitoring identifier.

2. The method according to claim 1, wherein the monitoring task addition/modification list comprises one of the following combinations:
    a monitoring identifier, a monitoring object, and a report configuration;
    the monitoring identifier and the monitoring object; and
    the monitoring identifier and the report configuration; and
    the monitoring task deletion list comprises: the monitoring identifier.

3. The method according to claim 2, wherein managing the monitoring task by the gateway according to the management parameter comprises:
    when the management parameter contains the monitoring task deletion list, and after the gateway searches out a fourth monitoring identifier which is the same as a third monitoring identifier in the local monitoring task list according to the third monitoring identifier in the monitoring task deletion list, deleting the fourth monitoring identifier, a fourth monitoring object corresponding to the fourth monitoring identifier, and a fourth report configuration corresponding to the fourth monitoring identifier.

4. An apparatus for managing a monitoring task, comprising:
    a hardware processor, configured to perform programming components stored in a memory, wherein the programming components comprise:
    a receiving module, configured to receive monitoring configuration information transmitted by a machine to machine, M2M, service platform or an M2M application server, wherein a management parameter for managing a monitoring task is carried in the monitoring configuration information; and
    the managing module, configured to manage the monitoring task according to the management parameter, wherein the management parameter comprises: a monitoring task addition/modification list, and/or a monitoring task deletion list, wherein when the management parameter contains the monitoring task addition/modification list, the managing parameter comprises:
    a storing unit, configured to, in the case that a first monitoring identifier in the monitoring task addition/modification list is not in a local monitoring task list, store the first monitoring identifier, a first monitoring object corresponding to the first monitoring identifier, and a first report configuration corresponding to the first monitoring identifier as a new monitoring task in the local monitoring task list; and
    a replacing unit, configured to, in the case that the first monitoring identifier in the monitoring task addition/modification list is in the local monitoring task list, replace a second monitoring object corresponding to a second monitoring identifier which is the same as the first monitoring identifier, and/or a second report configuration corresponding to the second monitoring identifier in the local monitoring task list with the first monitoring object corresponding to the first monitoring identifier and/or the report configuration corresponding to the first monitoring identifier.

5. The apparatus according to claim 4, wherein the monitoring task addition/modification list comprises one of the following combinations:
    a monitoring identifier, a monitoring object, and a report configuration;
    the monitoring identifier and the monitoring object; and
    the monitoring identifier and the report configuration; and
    the monitoring task deletion list comprises: the monitoring identifier.

6. The apparatus according to claim 5, wherein when the management parameter contains the monitoring task deletion list, the managing module comprises:
    a searching unit, configured to search for a fourth monitoring identifier which is the same as a third monitoring identifier in a local monitoring task list according to the third monitoring identifier in the monitoring task deletion list; and
    the deleting unit, configured to, after the searching unit searches out the fourth monitoring identifier, delete the fourth monitoring identifier, a fourth monitoring object corresponding to the fourth monitoring identifier, and a fourth report configuration corresponding to the fourth monitoring identifier.

* * * * *